US006754989B2

(12) United States Patent
Eicher

(10) Patent No.: US 6,754,989 B2
(45) Date of Patent: Jun. 29, 2004

(54) SHIELDING APPARATUS SECURED TO LANDSCAPING MATERIAL FOR SHIELDING A PLANT FROM WEED GROWTH

(76) Inventor: Todd Eicher, W6192 Tucker Rd., Monticello, WI (US) 53570

( * ) Notice: Subject to any disclaimer, the term of this patent is extended or adjusted under 35 U.S.C. 154(b) by 0 days.

(21) Appl. No.: 10/139,897

(22) Filed: May 6, 2002

(65) Prior Publication Data

US 2003/0204987 A1 Nov. 6, 2003

(51) Int. Cl.[7] .................................................. A01G 9/00
(52) U.S. Cl. ...................... 47/32; 47/9; 47/33; 47/21.1; 52/102
(58) Field of Search ............................. 47/9, 32, 21.1, 47/25, 33, 39; 52/102

(56) References Cited

U.S. PATENT DOCUMENTS 2,909,328 A * 10/1959 Babyak
3,955,319 A * 5/1976 Smith .............................. 47/9
4,702,034 A * 10/1987 Ferguson et al. ............. 47/33
5,771,631 A * 6/1998 Dawson ......................... 47/33
5,921,021 A * 7/1999 Coates ........................... 47/33
6,012,254 A * 1/2000 Gaston ......................... 52/102
6,085,458 A * 7/2000 Gau ............................... 47/33
6,138,405 A * 10/2000 Matz ............................. 47/33
6,341,445 B1 * 1/2002 Morrison ....................... 47/33

FOREIGN PATENT DOCUMENTS

CA       2193427     * 12/1996    ............ A01G/1/08
JP       404008236   *  1/1992    ............ A01G/13/00

* cited by examiner

Primary Examiner—Peter M Poon
Assistant Examiner—Andrea M. Valenti
(74) Attorney, Agent, or Firm—David J. Archer

(57) ABSTRACT

A shielding apparatus secured to landscaping material is disclosed for shielding a plant from weed growth. The apparatus includes an elongate plate having a first and a second edge, the plate defining an opening which is disposed between the edges of the plate for the growth therethrough of the plant. A first rail removably cooperates with the first edge of the plate such that the landscaping material is locked between the first rail and the first edge of the plate. Also, a second rail removably cooperates with the second edge of the plate such that the landscaping material is locked between the second rail and the second edge of the plate.

12 Claims, 4 Drawing Sheets

SHIELDING APPARATUS SECURED TO LANDSCAPING MATERIAL FOR SHIELDING A PLANT FROM WEED GROWTH

BACKGROUND OF THE INVENTION

1. Field of the Invention

The present invention relates to a shielding apparatus for shielding a plant from weed growth. More specifically, the present invention relates to a shielding apparatus secured to landscaping material for shielding a plant from weed growth.

2. Background Information

When young seedlings and the like are planted in soil, a major problem that is encountered is the rapid growth of weeds around the seedlings which tend to deplete the seedlings of the required soil nutrients and to choke the cultivation of such seedlings.

Additionally, the cultivation of plants requires an ample supply of water so that the plants can grow and not wither due to the soil drying out from solar radiation. Such watering is labor intensive and if many seedlings are being raised, the even supply of water to each plant can present a further problem.

The present invention provides a unique and relatively simple mechanism for protecting plants from weed growth and for watering such plants.

Therefore, it is a primary feature of the present invention to provide an apparatus for protecting plants from weed growth and for watering such plants that overcomes the problems associated with the prior art arrangements.

Another feature of the present invention is the provision of an apparatus for protecting plants from weed growth and for watering such plants that is relatively easy to manufacture.

A further feature of the present invention is the provision of an apparatus for protecting plants from weed growth and for watering such plants that is of relatively low cost.

Other features and advantages of the present invention will be readily apparent to those skilled in the art by a consideration of the detailed description of a preferred embodiment of the present invention contained herein.

SUMMARY OF THE INVENTION

The present invention relates to a shielding apparatus secured to landscaping material for shielding a plant from weed growth. The apparatus includes an elongate plate having a first and a second edge, the plate defining an opening which is disposed between the edges of the plate for the growth therethrough of the plant. A first rail removably cooperates with the first edge of the plate such that the landscaping material is locked between the first rail the first edge of the plate. Also, a second rail removably cooperates with the second edge of the plate such that the landscaping material is locked between the second rail the second edge of the plate.

In a more specific embodiment of the present invention, the plate is fabricated from plastics material, the plate being of planar configuration.

The plate includes a main body portion which defines the first and second edge and the opening. A first extension extends from the first edge of the main body portion and a second extension extends from the second edge of the main body portion.

More specifically, the first extension extends normal to the main body portion and the second extension also extends normal to the main body portion.

The main body portion defines a further opening which is disposed between the edges of the main body portion and adjacent to and spaced from the opening.

Additionally, the first rail includes a channel for the removable reception therein of the first extension. Also, the second rail includes a further channel for the removable reception therein of the second extension.

Moreover, the first rail further includes a wing which extends from the channel and away from the first edge of the plate. Additionally, the second rail further includes a further wing which extends from the further channel and away from the second edge of the plate. The arrangement is such that the landscaping material is supported by the wings so that the landscaping material is locked between the extensions and the corresponding channels by a locking interaction of the extensions and the corresponding channels such that growth of the plant through the opening is permitted while shielding the plant from weed growth.

Furthermore, the plate further defines an elongate conduit which extends past the opening. The conduit has an orifice such that when the conduit is connected to a water supply, a flow of water flows from the supply, through the conduit and through the orifice for watering the plant.

More particularly, a spray nozzle cooperates with the orifice for facilitating accurate watering of the plant.

Preferably, the plate and rails have a dark color for maximizing absorption of solar radiation.

The shielding apparatus further includes a translucent green house type cover which extends between the edges of the plate for protecting the plant while exposing the plant to solar radiation.

More specifically, the cover is fabricated from plastic material.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various embodiments and views of the drawings.

DETAILED DESCRIPTION OF THE DRAWINGS

Figure 1:
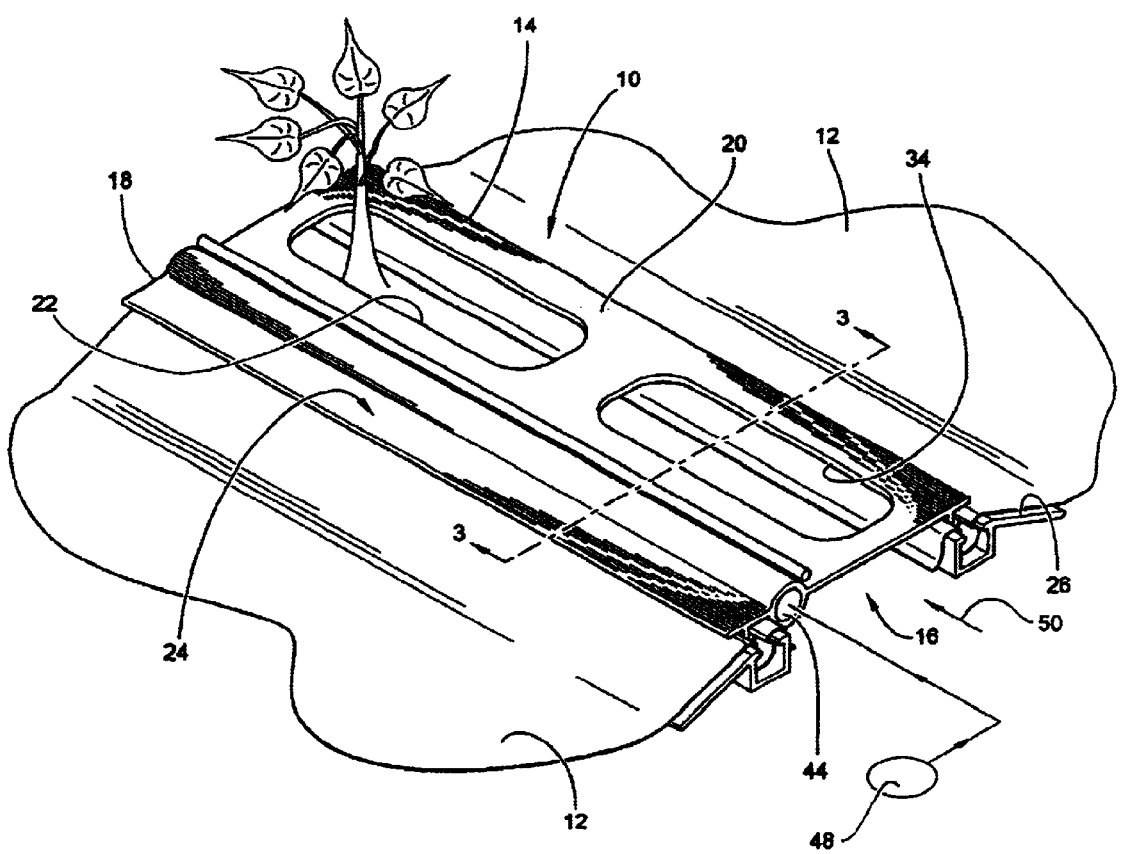
FIG. 1 is a perspective view of a shielding apparatus according to the present invention secured to landscaping material for shielding a plant from weed growth.

FIG. 1 is a perspective view of a shielding apparatus generally designated 10, according to the present invention, secured to landscaping material 12 for shielding a plant 14 from weed growth. As shown in FIG. 1, the apparatus 10 includes an elongate plate generally designated 16 having a first and a second edge 18 and 20 respectively. The plate 16 defines an opening 22 which is disposed between the edges 18 and 20 of the plate 16 for the growth therethrough of the plant 14. A first rail generally designated 24 removably cooperates with the first edge 18 of the plate 16 such that the landscaping material 12 is locked between the first rail 24 and the first edge 18 of the plate 16. Also, a second rail generally designated 26 removably cooperates with the second edge 20 of the plate 16 such that the landscaping material 12 is locked between the second rail 26 and the second edge 20 of the plate 16.

In a more specific embodiment of the present invention, the plate 16 is fabricated from plastics material, the plate 16 being of planar configuration.

Figure 2:
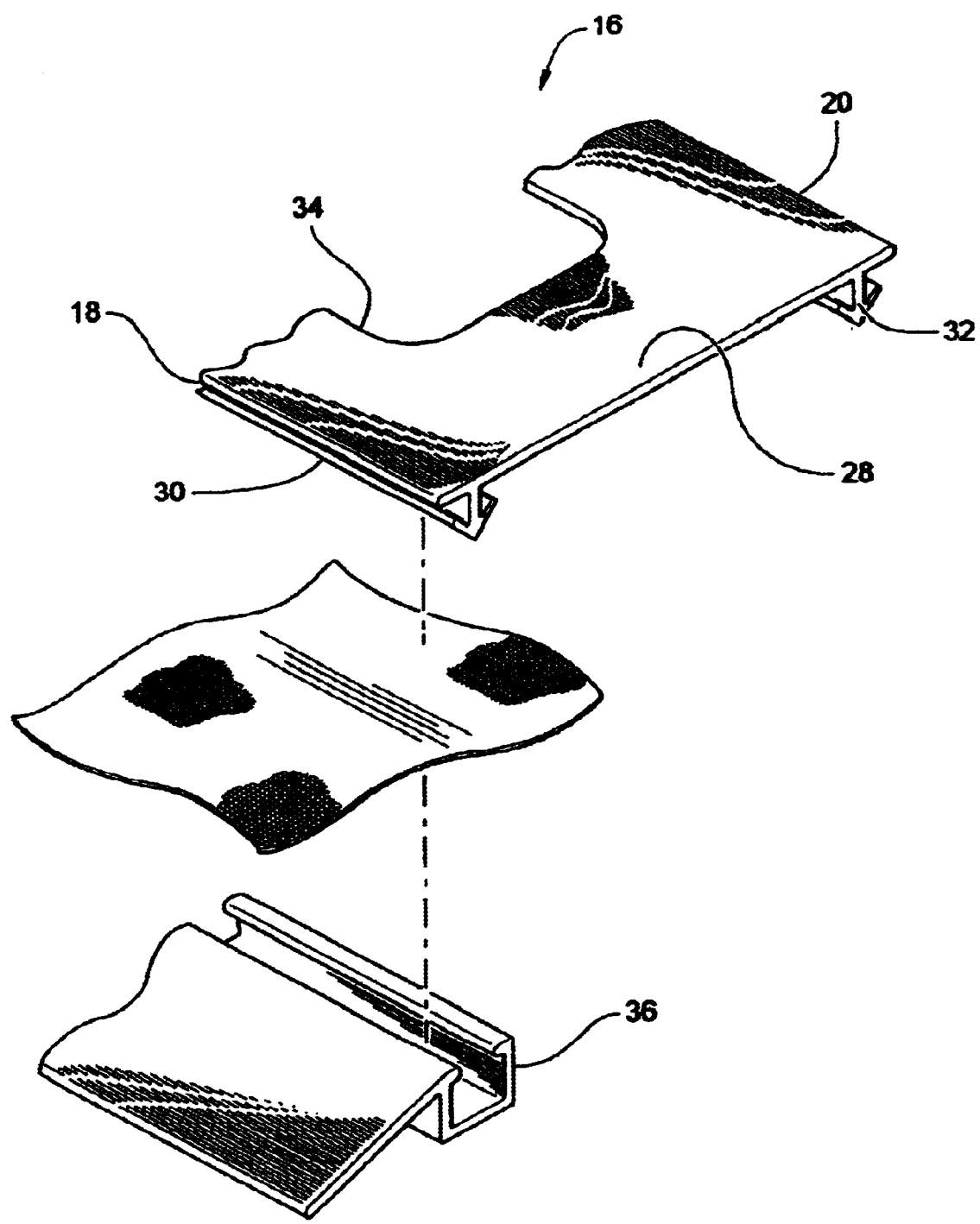
FIG. 2 is an enlarged perspective view of the plate shown in FIG. 1.

FIG. 2 is an enlarged perspective view of the plate 16. As shown in FIG. 2, the plate 16 includes a main body portion 28 which defines the first and second edge 18 and 20 and the opening 22 as shown in FIG. 1. A first extension 30 extends from the first edge 18 of the main body portion 28 and a second extension 32 extends from the second edge 20 of the main body portion 28. The extensions 30 and 32 are preferably of forked cross-sectional configuration.

More specifically, the first extension 30 extends normal to the main body portion 28 and the second extension 32 also extends normal to the main body portion 28.

As shown in FIG. 1, the main body portion 28 defines a further opening 34 which is disposed between the edges 18 and 20 of the main body portion 28 and adjacent to and spaced from the opening 22.

Additionally, as shown in FIG. 2, the first rail 24 includes a channel 36 for the removable reception therein of the first extension 30.

Figure 3:
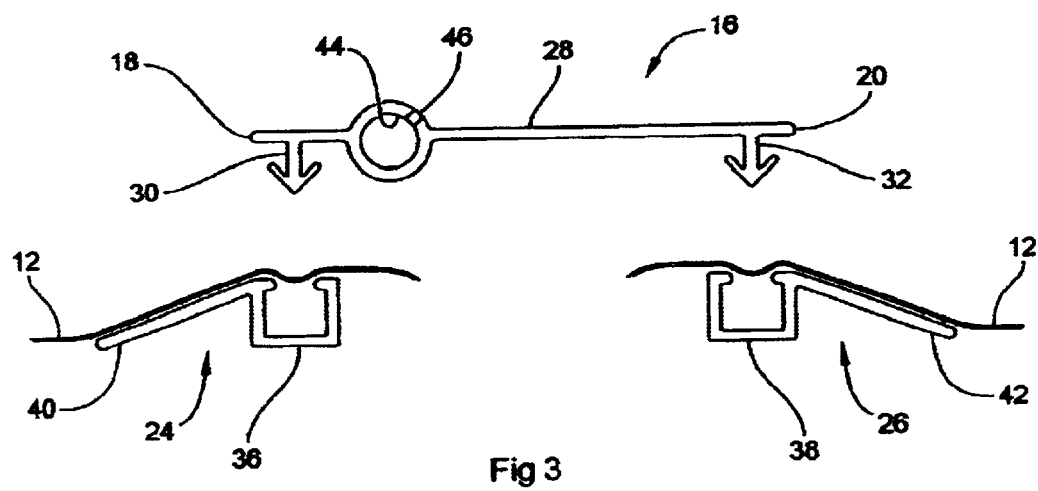
FIG. 3 is a sectional view taken on the line 3—3 of FIG. 1.

FIG. 3 is a sectional view taken on the line 3—3 of FIG. 1. As shown in FIG. 3, the second rail 26 includes a further channel 38 for the removable reception therein of the second extension 32.

Moreover, the first rail 24 further includes a wing 40 which extends from the channel 36 and away from the first edge 18 of the plate 16. Additionally, the second rail 26 further includes a further wing 42 which extends from the further channel 38 and away from the second edge 20 of the plate 16.

Figure 4:
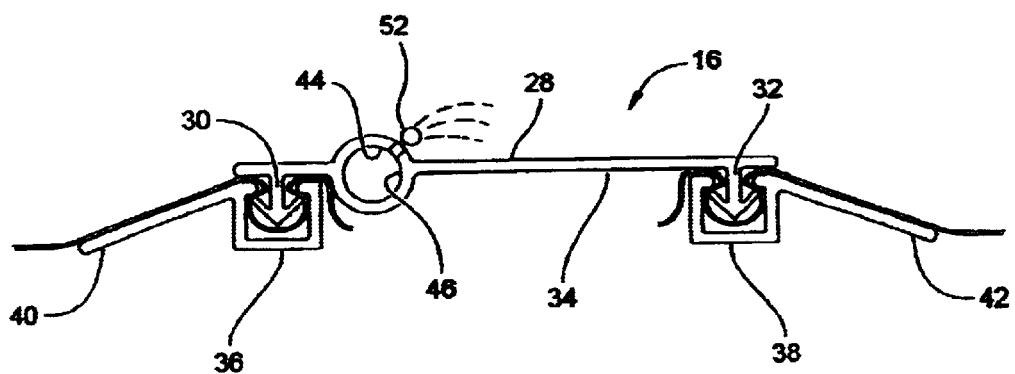
FIG. 4 is a similar view to that shown in FIG. 3 but shows the extensions locked within the respective channels.

FIG. 4 is a similar view to that shown in FIG. 3 but shows the extensions 30 and 32 locked within the respective channels 36 and 38. As shown in FIG. 4, the arrangement is such that the landscaping material 12 is supported by the wings 40 and 42 so that the landscaping material 12 is locked between the extensions 30 and 32 and the corresponding channels 36 and 38 by a locking interaction of the extensions 30 and 32 and the corresponding channels 36 and 38 respectively such that growth of the plant 14 through the opening 22 is permitted while shielding the plant 14 from weed growth.

As shown in FIGS. 1, 3 and 4, the plate 16 further defines an elongate conduit 44 which extends past the openings 22 and 34. The conduit 44 has an orifice 46 such that when the conduit 44 is connected to a water supply 48, as shown in FIG. 1, a flow of water indicated by the arrow 50 flows from the supply 48 through the conduit 44 and through the orifice 46 for watering the plant 14.

More particularly, as shown in FIG. 4, a spray nozzle 52 cooperates with the orifice 46 for facilitating accurate watering of the plant 14.

Preferably, the plate 16 and rails 24 and 26 have a dark color for maximizing absorption of solar radiation.

Figure 5:
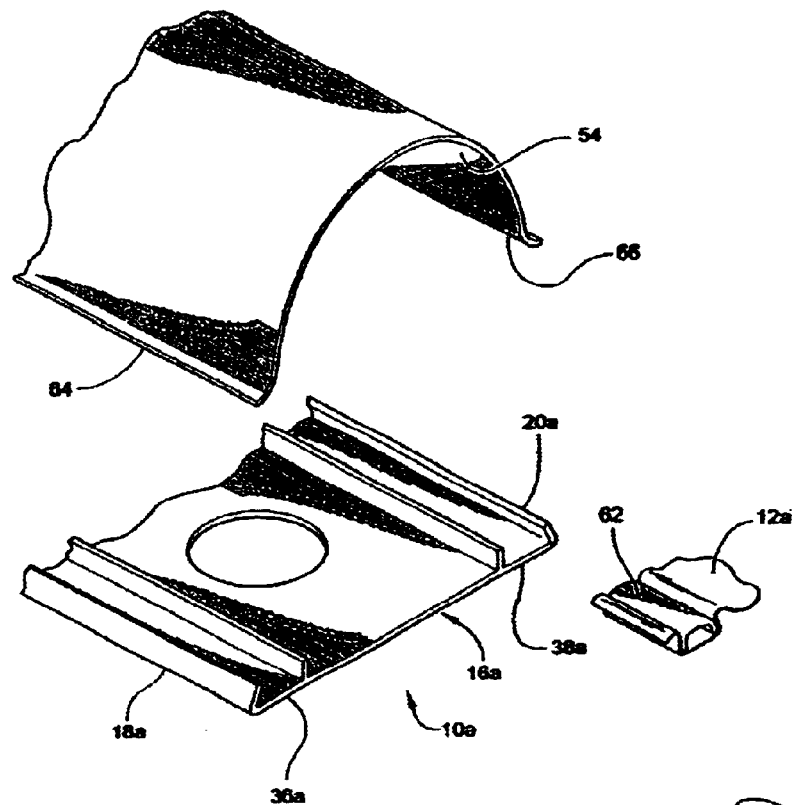
FIG. 5 is a perspective view of another embodiment of the present invention.

FIG. 5 is a perspective view of another embodiment of the present invention. As shown in FIG. 5, the shielding apparatus 10a further includes a translucent green house type cover 54 which extends between the edges 18a and 20a of the plate 16a for protecting the plant 14 while exposing the plant 14 to solar radiation. More specifically, the cover 54 is fabricated from plastic material.

Figure 6:
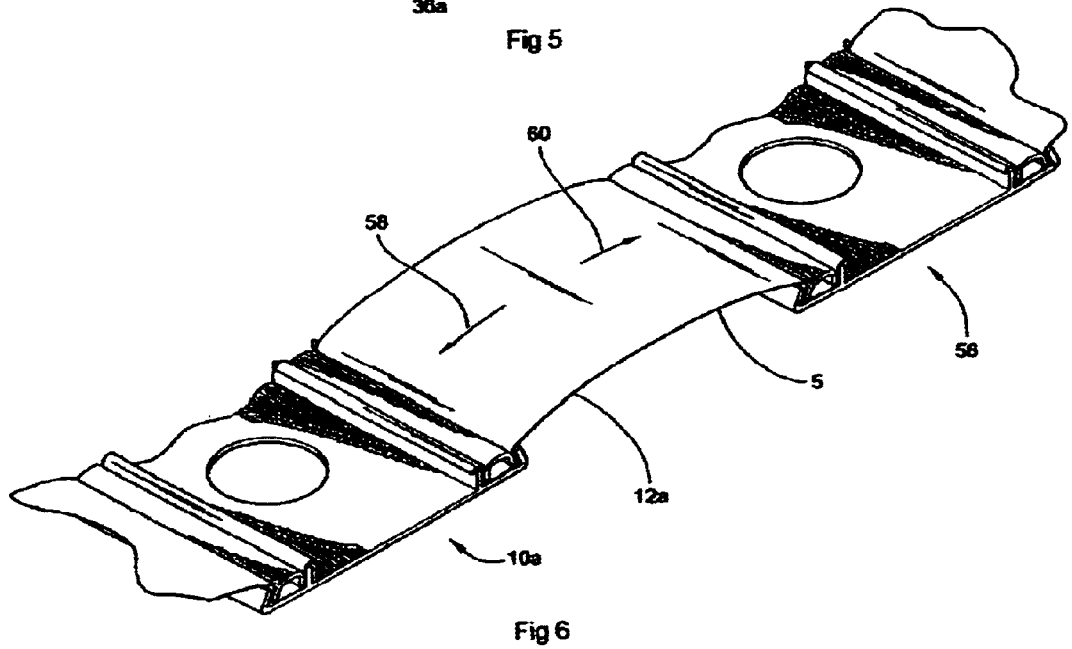
FIG. 6 is a perspective view of the apparatus shown in FIG. 5.

FIG. 6 is a perspective view of the apparatus shown in FIG. 5. As shown in FIG. 6, another apparatus 56 which is the same as the apparatus 10a is disposed spaced and parallel to the apparatus 10a.

In operation of the apparatus 10, the rails 24 and 26 are disposed beneath the landscaping material and the extensions 30 and 32 of the plate 16 are pushed into locking engagement with the channels 36 and 38 so that the edges of the landscaping material are fastened between the plate 16 and the rails 24 and 26. The landscaping material is preferably a black plastic film for preventing weed growth and for directing water towards the plants 14. Preferably, as shown in FIG. 6, the soil S located between the apparatus 10a and the adjacent apparatus 56 and disposed beneath the landscaping material 12a is piled up to create a mound as shown in FIG. 6 for directing the water in a first direction as indicated by the arrow 58 towards the apparatus 10a. The water is also directed as indicated by the arrow 60 in a second direction towards the adjacent apparatus 56.

Also, as shown in FIG. 5, the plate 16a is laid on the soil and the landscaping material 12a is laid over the edges 18a and 20a. A snap in extrusion 62 is inserted into the channel 38a for locking the landscaping material 12a between the plate 16a and the extrusion 62. A further extrusion (not shown) is likewise snapped into the channel 36a for securing the plate 16a to the landscaping material 12a. Subsequently, the lower extremities 64 and 66 of the cover 54 are inserted into and held in place by the channels 36a and 38a respectively. The cover 54 not only provides a greenhouse effect but also protects the growing plants from being eaten by rabbits and the like. The plate 16 and rails 24 and 26 are preferably fabricated in 4 and 6 foot lengths from plastic material using an extrusion process. Additionally, the apparatus according to the present invention can be repeatably assembled and disassembled according to the growing season.

The present provides a unique system which protects plants from weed growth while supplying the plant with necessary watering.

What is claimed is:

1. A shielding apparatus secured to landscaping material for shielding a plant from weed growth, said apparatus comprising:

an elongate plate having a first edge and a second edge disposed opposite to said first edge, said plate defining an opening disposed between said edges of said plate for the growth therethrough of the plant;

a first rail extending along said first edge, said first rail removably cooperating with said first edge of said plate such that the landscaping material is locked between said first rail and said first edge of said plate; and a second rail extending along said second edge, said second rail removably cooperating with said second edge of said plate such that the landscaping material is locked between said second rail and said second edge of said plate so that the landscaping material extends away from said shielding apparatus and the plant growing through said opening.

2. A shielding apparatus as set forth in claim 1 wherein said plate is fabricated from plastics material.

3. A shielding apparatus as set forth in claim 1 wherein said plate is of planar configuration.

4. A shielding apparatus as set forth in claim 1 wherein said plate includes:
- a main body portion which defines said first and second edge and said opening;
- a first extension extending from said first edge of said main body portion;
- a second extension extending from said second edge of said main body portion.

5. A shielding apparatus as set forth in claim 4 wherein said first extension extends normal to said main body portion;
said second extension extends normal to said main body portion.

6. A shielding apparatus as set forth in claim 4 wherein said main body portion defines a further opening disposed between said edges of said main body portion and adjacent to and spaced from said opening.

7. A shielding apparatus as set forth in claim 4 wherein said first rail includes:
- a channel for the removable reception therein of said first extension;
said second rail includes:
- a further channel for the removable reception therein of said second extension.

8. A shielding apparatus as set forth in claim 7 wherein said first rail further includes:
- a wing extending from said channel and away from said first edge of said plate;
said second rail further includes:
- a further wing extending from said further channel and away from said second edge of said plate, the arrangement being such that the landscaping material is supported by said wings so that the landscaping material is locked between said extensions and said corresponding channels by a locking interaction of said extensions and said corresponding channels such that growth of the plant through the opening is permitted while shielding the plant from weed growth.

9. A shielding apparatus as set forth in claim 1 wherein said plate further defines an elongate conduit which extends past said opening, said conduit having an orifice such that when said conduit is connected to a water supply, a flow of water flows from the supply, through said conduit and through said orifice for watering the plant.

10. A shielding apparatus as set forth in claim 9 further including:
- a spray nozzle which cooperates with said orifice for facilitating accurate watering of the plant.

11. A shielding apparatus as set forth in claim 1 wherein said plate and rails have a dark color for maximizing absorption of solar radiation.

12. A shielding apparatus secured to landscaping material for shielding a plant from weed growth, said apparatus comprising:
- an elongate plate having a first edge and a second edge disposed opposite to said first edge, said plate defining an opening disposed between said edges of said plate for the growth therethrough of the plant;
- a first rail extending along said first edge, said first rail removably cooperating with said first edge of said plate such that the landscaping material is locked between said first rail and said first edge of said plate;
- a second rail extending along said second edge, said second rail removably cooperating with said second edge of said plate such that the landscaping material is locked between said second rail and said second edge of said plate so that the landscaping material extends away from said shielding apparatus and the plant growing through said opening; and
- said plate further defining a conduit which extends past said opening, said conduit having an orifice such that when said conduit is connected to a water supply, a flow of water flows from the supply, through said conduit and through said orifice for watering the plant.

* * * * *